Patented Apr. 17, 1951

2,549,220

UNITED STATES PATENT OFFICE 2,549,220

COATED WRAPPING TISSUE AND PROCESS OF MAKING SAME

Arthur Douglas McLaren, Brooklyn, N. Y., assignor to E. I. du Pont de Nemours & Company, Wilmington, Del., a corporation of Delaware No Drawing. Application February 13, 1948, Serial No. 8,299

11 Claims. (Cl. 117—76)

This invention relates to processes for effecting physical bonding between materials and to articles so bonded, and is more particularly directed to processes for bonding materials having negatively charged surfaces to water-insoluble, heat-softenable, organic polymers containing recurring dipole groups. Still more particularly, the invention relates to the production of transparent regenerated cellulose film provided with a well-adhered moisture proofing coating of vinylidene chloride copolymer.

This application is a continuation-in-part of my prior application Serial No. 648,833, filed February 19, 1946, now abandoned, as "Wrapping Tissue and Process."

The desirability of effecting improved bonding between materials has been recognized in a variety of situations. It has been realized that composite structures made up of dissimilar materials could possess the advantageous properties of each of the constituent materials and at the same time have additional, especially desirable properties resulting from the combination, if only suitable ways of effecting permanent joining of the materials could be found.

The problems of adhesion are particularly troublesome when at least one of the materials to be joined has a negatively charged surface, such as is present for instance in regenerated cellulose sheet and like materials containing a substantial proportion of negative groups such as hydroxyl groups on their surfaces. Bonds to such negatively charged materials tend to be easily disrupted by moisture.

To mention a particular instance, an outstanding problem in the utilization of vinylidene chloride copolymers as coatings for smooth, dense, non-fibrous, hydrophilic, hydroxylated organic polymer structures such as regenerated cellulose film, to be used as transparent wrapping tissue, etc., has been to adhere the coating to the base sheet. Vinylidene chloride copolymers such as vinylidene chloride-acrylonitrile copolymer and vinylidene chloride-vinyl chloride copolymer adhere very poorly to regenerated cellulose film and the like and the usual expedients for anchoring conventional moisture-proofing coating to base film do not in general yield satisfactory results when applied to the copolymers. Obviously, unless a high order of adhesion is obtained, full advantage cannot be taken of the desirable properties of moisture-proofness, heat-sealability, flexibility, toughness, etc., inherent in such polymers.

Vinylidene chloride copolymer coatings are representative of a class of polymers which may be designated as water-insoluble, heat-softenable organic polymers containing recurring dipole groups, and regenerated cellulose film is representative of the class of materials which may be designated as having negatively charged surfaces.

It is an object of this invention to provide improved methods for bonding such organic polymers to negatively charged surfaces and to provide the improved bonded structures so produced. A more specific object is to tightly bond vinylidene chloride copolymer coatings to regenerated cellulose and similar base film. Another object is to treat regenerated cellulose film whereby to promote adhesion of the film to vinylidene chloride copolymers. A further object is to provide a flexible, transparent, moisture-proof sheet wrapping tissue comprised of regenerated cellulose having a strongly anchored coating of vinylidene chloride copolymer. These and other objects will more clearly appear hereinafter.

The foregoing and other objects are accomplished according to this invention by processes in which contact is effected between a negatively charged surface and the metal atom of a Werner type complex compound in which a trivalent nuclear atom of a metal of the group consisting of chromium, manganese, iron, cobalt, and nickel is coordinated with the carboxylic acido group from the class consisting of aliphatic carboxylic acido groups having less than 6 carbon atoms in the chain and bearing at least one dipole group and aromatic carboxylic acido groups bearing at least one dipole group and a coating of a water-insoluble, heat-softenable, organic polymer containing recurring dipole groups is applied thereto, and are further accomplished by the bonded structures so produced. More specific objects of the invention are accomplished by processes which comprise treating, e. g., by impregnating, a smooth, dense, flexible, non-fibrous sheet or film of a hydrophilic hydroxylated organic polymer such as regenerated cellulose with a solution of a compound of the Werner type in which a trivalent nuclear atom of a metal of the group consisting of chromium, manganese, iron, cobalt and nickel is coordinated with a carboxylic acido group from the class consisting of aliphatic carboxylic acido groups having less than six carbon atoms in the chain and bearing dipole groups and aromatic carboxylic acido groups bearing dipole groups, drying the treated film to remove solvent and thereafter coating the dried film with a vinylidene chloride copolymer in the usual fashion.

In the bonded structures of my invention the Werner-type compound serves as an anchoring agent to hold the organic polymer to the negatively charged surface. The metal atom of the Werner complex coordinates with the strongly negative groups such as hydroxyl groups on the negatively charged surface and the dipole groups of the Werner compound are anchored to the organic polymer by dipole attraction. Accordingly the bond between the dipole groups must be regarded as a physical bond since there is no chemical interaction between these groups.

In a specific embodiment of the invention the negatively charged material may be in the form of a base sheet or film which is smooth, dense, flexible, and non-fibrous and consists of any hydroxylated organic material which is hydrophilic, that is, absorbs or adsorbs water, for example, regenerated cellulose, lowly substituted cellulose esters (cellulose acetate, cellulose propionate, cellulose nitrate, etc.), lowly substituted cellulose ethers (ethyl cellulose, methyl cellulose, etc.), polyvinyl alcohols, polyvinyl butyral, hydrolyzed vinyl acetate interpolymers, and the like. However, because of its commercial availability, cheapness, generally desirable properties and present importance, regenerated cellulose is a preferred base material and the invention will be further described with specific reference thereto.

The compounds of the Werner type (hereinafter termed "anchoring agent") useful for purposes of my invention are the soluble complex compounds produced by processes in which contact, in the substantial absence of water, is effected between carboxylic acids of the group consisting of aliphatic carboxylic acids having less than six carbon atoms in the chain and bearing at least one dipole substituent and aromatic carboxylic acids bearing at least one dipole substituent, and basic salts of trivalent chromium, manganese, iron, cobalt or nickel with a mono-basic acid, the basicity of the metal salts being no greater than about 50%. The general methods disclosed in Iler, U. S. Patents Nos. 2,273,040 and 2,356,161, are suitable for the preparation of the complexes useful herein. Chromium complexes are specifically preferred for purposes of this invention. Examples of carboxylic acids used in the production of these complexes include mono-, di-, and tri-chloro acetic acids and other chloro-, bromo- or iodo- aliphatic acids of a chain length of less than six carbon atoms, nitroacetic acid, hydroxyacetic acid, cyanoacetic acid; acids bearing oxygen or nitrogen heterocyclic radicals such as indolacetic acid; amino acids including polypeptides; nitrobenzoic acid, hydroxybenzoic acid, cyanobenzoic acid, 3,5-dinitrosalicylic acid, phenoxyacetic acid, etc.; in short, any carboxylic acid (of short chain length if aliphatic) bearing dipole groups having moments [the moment, e. g., in chloroacetic acid is that of C—Cl (1.9 D. U.)] within the range of from 0.1 to 15 Debye units.

The organic polymer which is bonded to the anchoring agent by dipole forces should be substantially water insoluble. That is, 10,000 parts of water should not dissolve more than about 1 part by weight of the polymer.

The organic polymer should also be heat-softenable. There are included within this class the types of polymers known as thermoplastic and also thermosetting resins prior to curing. Thermoplastics, of course, are those organic polymers which remain soft permanently under heat.

The organic polymer should also contain recurring dipole groups. By dipole groups is meant groups which exhibit a substantial dipole moment. The groups C—Cl, C—CN, C—OH, C—COOH, C—NH$_2$ are, for example, such dipole groups. The C—Cl group occurs recurrently in vinylidene chloride polymers, for instance; the C—CN group appears recurrently in acrylonitrile, the C—OH group appears recurrently in cellulose polymers, and other dipole groups which may be used according to this invention appear recurrently in a similar manner in other polymers.

Representative, therefore, of water-insoluble, heat-softenable organic polymers containing recurring groups which may be bonded by dipole forces to the anchoring agent according to this invention are condensation polymers such as phenol-formaldehyde and urea-formaldehyde resins in the uncured state, nylons, glycerol-unsaturated acid condensation products and high molecular weight ethylene oxide condensation products; vinyl polymers such as polystyrene, polyvinyl chloride, neoprene, polyvinyl acetate, polymethacrylate polymers, vinylidene chloride polymers and polymers based on phthalic anhydride reacted with unsaturated alcohols; and cellulose plastics such as regenerated cellulose and cellulose acetate.

Treatment of the material having negatively charged surface with the Werner complex may be accomplished in any suitable fashion which insures intimate contact of the complex with the film. In treating regenerated cellulose film, for instance, the most convenient and economical procedure is to incorporate the anchoring agent in the aqueous softening bath through which the gel regenerated film is ordinarily brought in the course of manufacture. The amount of chromium or other Werner complex incorporated in or on the film may vary from 0.2 to over 1% by weight (calculated as $Cr_2O_3$ in the case of chromium) based on the weight of the dry sheet. Preferably the anchoring agent should be applied in amounts within the range of 0.5% to 1.0%.

Compounds of the Werner type formed from basic trivalent metal chlorides when employed in accordance with this invention should be neutralized simultaneously with or subsequent to application to the material having negatively charged surface if liberation of hydrochloric acid would cause attack of said material, such as is the case with regenerated cellulose film. As neutralizing agents there may be employed the usual bases such as ammonium hydroxide, urea, guanidine, biuret, alkyl and aryl amines, picolines, pyridine, etc. A buffered neutralizing mixture of the following composition:

| | Per cent |
|---|---|
| Urea | 16.5 |
| Sodium formate | 5.0 |
| Formic acid | 0.2 |
| Water | 78.3 | has been found particularly effective.

Because of their superior moistureproofness and heat seal characteristics copolymers of vinylidene chloride with acrylonitrile and particularly methyl ethyl ketone-soluble copolymers of vinylidene chloride with acrylonitrile wherein the weight ratio of vinylidene chloride to acrylonitrile is from 4:1 to 19:1, constitute the preferred vinylidene chloride copolymers to be joined by dipole forces to the particular negatively charged surface, regenerated cellulose film, according to this invention. However, for such film any other organic solvent soluble, film-forming vinylidene chloride copolymer may be similarly employed in accordance with the principles of this invention. Such polymers include, by way of example, the copolymers of vinylidene chloride with vinyl chloride, with vinyl acetate, with divinyl ether, with styrene, with acryl acrylates or with alkyl esters of substituted acrylic acids. The preparation of vinylidene chloride-acrylonitrile copolymers containing at least 80% vinylidene chloride and soluble in organic solvents, e. g., methyl ethyl ketone, is described and claimed in United States patent application of Chester R. Hardt, Serial No. 605,185 filed July 14, 1945.

The application of the organic polymer to be bonded by dipole forces may be accomplished in any suitable manner such as by passing the negatively charged surface material containing the anchoring agent thereon through an organic solvent-solution of the polymer, by spraying or brushing such a solution on the treated base, or by superimposing the polymer upon the treated base and heating. When the polymer is to be applied by solution as a coating, any excess of coating may be removed by the usual expedients including doctor blades, doctor rolls, etc.

When the organic polymer is to be applied as a solution to a base film such as regenerated cellulose, for optimum results a solution containing about 15% solids, such as vinylidene chloride copolymer with acrylonitrile, is applied in an amount sufficient to uniformly deposit about 8 grams per square meter of copolymer on the base film. However, depending on the equipment and method of coating used, and degree of moistureproofness desired, solutions containing more or less solids, and coatings of greater or lesser thickness can be applied with good result.

It will be understood that, whatever the method of applying the polymer, the conditions of application are not such as to effect chemical reaction between the anchoring agent and the polymer but that the bonding which occurs between the polymer and anchoring agent is effected by dipole forces and is a physical bond.

With special reference to the coating of regenerated cellulose film with organic polymer through an anchoring agent, the term "anchor" or equivalent expressions is used herein to mean the securing of the surface or top coating on the base to the end that the coating will not loosen, slough, blister, or flake from the base film even when the coated film is subjected to a wide range of temperature and humidity conditions (up to 100% R. H.), etc. Moistureproofness, heat seal bond strength, and kindred terms and expressions are defined in U. S. Patent No. 2,147,180 (Ubben) and are employed herein in accordance with such definitions.

The following examples, wherein are set forth preferred embodiments, will further illustrate the principles and practice of this invention. Throughout the specification and claims, parts and percentages are by weight unless otherwise indicated.

Example I 450 gauge regenerated cellulose gel film was run through an aqueous glycerol softening bath consisting of:

| | Parts |
|---|---|
| An isopropyl alcohol solution containing 30% benzyloxyacetochromic chloride | 20 |
| Glycerol | 60 |
| Water | 600 |
| Neutralizing agent | 24 |

The neutralizing agent consisted of:

| | Percent |
|---|---|
| Urea | 16.5 |
| Sodium formate | 5.0 |
| Formic acid | 0.2 |
| Water | 78.3 |

After drying at 180° F. over steel rolls the resulting film was found by analysis to contain 0.66% chromium calculated as $Cr_2O_3$. The dried film was then coated with a methyl ethyl ketone solution (12% solids) of a vinylidene chloride-acrylonitrile (80:20) copolymer to a coating thickness of 0.17 mil.

The heat seal strength of the coated film (1½" wide seals) was 260 grams as compared with a heat seal strength of 67 grams for a control (i. e., an identically coated film without the anchoring agent).

Example II

A 450 gauge regenerated cellulose gel film was impregnated as in Example I with a composition consisting of:

| | Parts |
|---|---|
| An isopropanol solution containing 30% of a chromium complex of cyanoacetic acid | 20 |
| Glycerol | 60 |
| Water | 600 |
| Neutralizing agent (same as in Example 1) | 24 | and the dried film containing 0.73% chromium calculated as $Cr_2O_3$ was coated with vinylidene chloride-acrylonitrile copolymer as in Example I.

The heat seal strength of the resulting coated film was about 400 grams as compared with 67 grams for the control.

Example III 450 gauge regenerated cellulose gel film was impregnated with a composition consisting of:

| | Parts |
|---|---|
| A 30% isopropanol solution of chromium complex of 3,4-dinitrosalicylic acid | 23 |
| Glycerol | 60 |
| Water | 600 |
| Neutralizing agent (same as in Example 1) | 27 | and thereafter dried. The dried film was coated on both sides with the coating composition of Example I and the solvent removed to yield a coating having a total thickness of 0.28 mil.

The heat seal strength of the coated film so produced was 126 grams which compares with 40 grams for the control, and 6 grams for a substantially identical film wherein the dipole-containing anchoring agent was replaced with stearato chromic chloride.

An outstanding advantage of my invention as shown in the foregoing examples is that it enables the art to take full advantage of the manifestly desirable characteristics of vinylidene chloride copolymers as protective coatings for a wide variety of dense, smooth, non-fibrous structures of hydrophilic hydroxylated organic polymers, particularly regenerated cellulose, polyvinyl alcohol, etc., and thus widens the field of utility and enhances the effectiveness of said polymers and copolymers.

Example IV

A 450 gauge regenerated cellulose film was impregnated as in Example I with a composition consisting of an isopropanol solution containing 30% of a chromium complex of trichloracetic acid, together with glycerol, water, and neutralizing agent in the proportions of Example I and the dried film was coated with a copolymer containing 60 parts of vinylidene chloride and 40 parts of vinyl chloride dissolved in a solvent containing equal parts by weight of toluene and methyl isobutyl ketone.

The heat seal strength of the resulting coated film was about 132 grams as compared with 40 grams for the control.

Example V

A coated regenerated cellulose film was prepared exactly as in Example IV except that the chromium complex used as an anchoring agent was 3,5-dinitrosalicylic acid complex of chromium.

The heat seal strength of the resulting coated film was about 126 grams as compared with 40 grams for the control.

Example VI

A coated regenerated cellulose film was prepared exactly as in Examples IV and V except that the anchoring agent was a Werner complex of 2-nitro-2-methylpropionic acid with chromium.

The heat seal strength of the resulting coated film was about 114 grams as compared with 40 grams for the control.

The dipole moment of the trichloracetic acid radical in Example IV was about 1.0 Debye units, the dipole moment of the dinitrosalicylic radical in Example V was about 3.9 Debye units, and the dipole moment of the 2-nitro-2-methylpropionic acid radical in Example VI was 3.1 Debye units.

As many widely different embodiments can obviously be made without departing from the spirit and scope of my invention, it is to be understood that it is not to be restricted in any way save as set forth in the appended claims.

I claim:

1. A wrapping tissue comprising a dense, smooth, non-fibrous base sheet of hydrophilic, hydroxylated organic polymer, a coating on said base sheet comprising essentially a vinylidene chloride copolymer and an intermediate anchoring medium comprising essentially a compound of the Werner type in which a trivalent nuclear atom of a metal of the group consisting of chromium, manganese, cobalt, and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the amount of said anchoring medium being from 0.2% to 1.0% by weight, calculated as the oxide of the trivalent metal, based on the dry weight of the base sheet.

2. A wrapping tissue comprising a dense, smooth, non-fibrous, transparent base sheet of hydrophilic, hydroxylated organic polymer, a coating on said base sheet comprising essentially a vinylidene chloride copolymer, and an intermediate anchoring medium comprising essentially a compound of the Werner type in which a trivalent nuclear atom of a metal of the group consisting of chromium, manganese, iron, cobalt, and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the dipole group moments of said dipole groups being within the range of from 0.1 to 15 Debye units, the amount of said anchoring medium being from 0.2% to 1.0% by weight, calculated as the oxide of the trivalent metal, based on the dry weight of the base sheet.

3. A wrapping tissue comprising a dense, smooth, non-fibrous transparent base sheet of hydrophilic, hydroxylated organic polymer, a coating on said base sheet comprising essentially a vinylidene chloride copolymer, and an intermediate anchoring medium comprising essentially a compound of the Werner type in which a trivalent nuclear atom of chromium is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the dipole group moments of said dipole groups being within the range of from 0.1 to 15 Debye units, the amount of said anchoring medium being from 0.5% to 1.0% by weight, calculated as $Cr_2O_3$, based on the dry weight of the base sheet.

4. The wrapping tissue of claim 1 wherein the hydroxylated organic polymer is regenerated cellulose.

5. The wrapping tissue of claim 2 wherein the hydroxylated organic polymer is regenerated cellulose.

6. The wrapping tissue of claim 3 wherein the hydroxylated organic polymer is regenerated cellulose.

7. In a process for producing moistureproof wrapping tissue having a base of hydrophilic, hydroxylated organic polymer, the steps comprising appling to a smooth, dense, non-fibrous base sheet of hydrophilic, hydroxylated organic polymer a solution of a compound of the Werner type in which a trivalent nuclear atom of a metal of the group consisting of chromium, manganese, iron, cobalt and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the amount of solution used being sufficient to apply to said base sheet from 0.2% to 1.0% by weight of said Werner type compound, calculated as the oxide of the trivalent metal, based on the dry weight of said base sheet, drying the base sheet to remove solvent, and thereafter applying a coating of vinylidene chloride copolymer on said base sheet.

8. In a process for producing moistureproof wrapping tissue having a base of regenerated cellulose the steps comprising applying to a base sheet of regenerated cellulose a solution of a compound of the Werner type in which a trivalent nuclear atom of a metal of the group consisting of chromium, manganese, iron, cobalt and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, drying the base sheet to remove solvent, and thereafter appling a coating of vinylidine chloride copolymer on said base sheet.

9. In a process for producing moistureproof wrapping tissue having a base of regenerated cellulose the steps comprising impregnating a base sheet of regenerated cellulose gel film with an aqueous solution containing a compound of the Werner type in which a trivalent nuclear atom of a metal of the group consisting of chromium, manganese, iron, cobalt and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the amount of solution used being sufficient to apply to said base sheet from 0.2% to 1.0% by weight of said Werner type compound, calculated as the oxide of the trivalent metal, based on the dry weight of said base sheet, drying the base sheet to remove solvent, and thereafter applying a coating of vinylidene chloride copolymer on said base sheet.

10. In a process for producing moistureproof wrapping tissue having a base of hydrophilic, hydroxylated organic polymer the steps comprising applying to a smooth, dense, non-fibrous base sheet of hydrophilic hydroxylated organic polymer a solution of a compound of the Werner type in which a trivalent nuclear atom of chromium is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the amount of solution used being sufficient to apply to said base sheet from 0.5% to 1.0% by weight of said Werner type compound, calculated as $Cr_2O_3$, based on the weight of said base sheet, drying the base sheet to remove solvent, and thereafter applying a coating of vinylidene chloride copolymer on said base sheet.

11. In a process for producing moistureproof wrapping tissue having a base of regenerated cellulose the steps comprising impregnating a base sheet of regenerated cellulose gel film with an aqueous solution containing a compound of the Werner type in which a trivalent nuclear atom of chromium is coordinated with a carboxylic acido group from the class consisting of saturated aliphatic carboxylic acido groups having less than six carbon atoms in the chain and bearing at least one dipole group and aromatic carboxylic acido groups bearing at least one dipole group, the amount of solution used being sufficient to apply to said base sheet from 0.5% to 1.0% by weight of said Werner type compound, calculated as $Cr_2O_3$, based on the weight of said base sheet, drying the base sheet to remove solvent, and thereafter applying a coating of vinylidene chloride copolymer on said base sheet.

ARTHUR DOUGLAS McLAREN.

REFERENCES CITED

The following references are of record in the file of this patent:

UNITED STATES PATENTS

| Number | Name | Date |
| --- | --- | --- |
| 2,273,040 | Iler | Feb. 17, 1942 |
| 2,356,161 | Iler | Aug. 22, 1944 |